(12) United States Patent
Yoshikawa et al.

(10) Patent No.: US 6,274,233 B1
(45) Date of Patent: Aug. 14, 2001

(54) MAGNETIC RECORDING MEDIUM

(75) Inventors: Toshihiko Yoshikawa; Akira Sakawaki; Hiroshi Sakai, all of Chiba; Tetsuya Osaka, Tokyo, all of (JP)

(73) Assignees: Showa Denko Kabushiki Kaisha; Waseda University, both of Tokyo (JP)

( * ) Notice: Subject to any disclaimer, the term of this patent is extended or adjusted under 35 U.S.C. 154(b) by 0 days.

(21) Appl. No.: 09/276,466

(22) Filed: Mar. 25, 1999

Related U.S. Application Data

(60) Provisional application No. 60/118,162, filed on Feb. 1, 1999, provisional application No. 60/118,163, filed on Feb. 1, 1999, and provisional application No. 60/118,164, filed on Feb. 1, 1999.

(30) Foreign Application Priority Data

Mar. 26, 1998 (JP) .................................................. 10-079845
Mar. 26, 1998 (JP) .................................................. 10-079846
Mar. 26, 1998 (JP) .................................................. 10-079847

(51) Int. Cl.$^7$ ....................................................... G11B 5/66
(52) U.S. Cl. .................... 428/332; 428/336; 428/694 T; 428/694 TM; 428/694 TS; 428/900
(58) Field of Search ........................ 428/694 T, 694 TM, 428/694 TS, 900, 336, 332

(56) References Cited

U.S. PATENT DOCUMENTS 4,801,481 * 1/1989 Sagoi ..................................... 428/64
5,665,460 * 9/1997 Sugita ................................... 428/212
5,942,309 * 8/1999 Kamijo ................................. 428/141
5,981,039 * 11/1999 Isono ................................... 428/189

FOREIGN PATENT DOCUMENTS 63-090025   4/1988  (JP) .

* cited by examiner

*Primary Examiner*—Leszek Kiliman
(74) *Attorney, Agent, or Firm*—Sughrue, Mion, Zinn, Macpeak & Seas, PLLC

(57) ABSTRACT

A magnetic recording medium comprising a substrate 1 having thereon an in-plane magnetic film 3 having a magnetic easy axis oriented in the in-plane direction with respect to the substrate and a vertical magnetic film 6 having a magnetic easy axis oriented perpendicularly to the substrate. The in-plane magnetic film 3 is disposed closer to the substrate 1 than the vertical magnetic film 6. In preferred embodiments, the magnetic recording medium may further comprise a separation film 4 disposed between the in-plane magnetic film 3 and the vertical magnetic film 6, a nonmagnetic intermediate layer 5 having an hcp structure disposed between the separation film 4 and the vertical magnetic film 6, and a protective film 7. The magnetic recording medium is adapted for use with a signal processing system generally used for in-plane magnetic recording media without modification of the signal processing system.

20 Claims, 1 Drawing Sheet

MAGNETIC RECORDING MEDIUM

CROSS REFERENCE TO RELATED APPLICATIONS

This application is an application filed under 35 U.S.C. §111(a) claiming benefit pursuant to 35 U.S.C. §119(e)(i) of the filing date of the Provisional Application Nos. 60/118,162, 60/118,163 and 60/118,164 filed Feb. 1, 1999 pursuant to 35 U.S.C. §111(b).

FIELD OF THE INVENTION

The present invention relates to a magnetic recording medium, and more specifically, the present invention relates to a magnetic recording medium having excellent noise properties.

BACKGROUND OF THE INVENTION

Most commercially available magnetic recording media are an in-plane magnetic recording media where the magnetic easy axis of the magnetic film is mainly oriented parallel to the substrate. If such an in-plane magnetic recording medium is fabricated to have a high recording density, the bit volume is excessively reduced and the reproduction properties may deteriorate due to a thermal fluctuation effect or the like. Furthermore, it is also known that media with high recording density suffer from an increase in the medium noise due to expansion of the magnetization reversal transition region or the like.

On the other hand, a so-called vertical magnetic recording medium where the magnetic easy axis in the magnetic film is oriented perpendicularly to the substrate is advantageous in that low noise can be attained even with high recording density. This is because a sharp magnetization transition is formed and as the recording density increases, the demagnetization field is decreased and stabilized. Moreover, high recording density can be attained even when the bit volume is relatively large. As such, the vertical magnetic recording medium is drawing the attention of investigators in this field.

However, the vertical magnetic recording medium has a reproduction waveform different from that of the in-plane magnetic recording medium. More specifically, the isolated waveform is not a single peak type but contains a di-pulse waveform. Accordingly, it is difficult to apply the signal processing system commonly used for in-plane recording media without modification.

To cope with this, a vertical and in-plane composite type magnetic recording medium has been proposed, which comprises both an in-plain magnetic film and a vertical magnetic film. Such structure enables the use of the same signal processing system as used for in-plane magnetic recording media.

In recent years, the demand for magnetic recording media with higher recording density has been increasing and in keeping with this tendency, there is a demand for improved noise properties.

However, conventional magnetic recording media are by no means entirely satisfactory with respect to noise properties, and there is also a demand for magnetic recording media having more excellent noise properties. The present invention has been achieved in consideration of the above problems of the prior art.

SUMMARY OF THE INVENTION

It is therefore an object of the present invention to provide a magnetic recording medium adapted for use with the signal processing system commonly used for in-plane magnetic recording media without modification and having excellent noise properties.

The above object has been achieved in a first embodiment of the invention by providing a magnetic recording medium comprising a substrate having thereon an in-plane magnetic film having a magnetic easy axis oriented in the in-plane direction with respect to the substrate and a vertical magnetic film having a magnetic easy axis oriented perpendicularly to the substrate, the in-plane magnetic film being disposed closer to the substrate than the vertical magnetic film and having a coercivity Hc of from 1,500 to 4,000 Oe and a remnant magnetization film thickness product BrT of from 20 to 100 G$\mu$m, and the vertical magnetic film having a coercivity Hc of from 1,500 to 4,000 Oe and a thickness of from 100 to 1,000 Å.

In this first embodiment, the vertical magnetic film preferably has a thickness of from 100 to 600 Å and the in-plane magnetic film preferably has a remnant magnetization film thickness product BrT of from 20 to 50 G$\mu$m.

A separation film comprising a material capable of growing non-epitaxially to the in-plane magnetic film is preferably disposed between the in-plane magnetic film and the vertical magnetic film, and the separation film preferably has a thickness of from 5 to 200 Å.

A nonmagnetic intermediate layer having an hcp structure is preferably disposed between the separation film and the vertical magnetic film.

Furthermore, the clearance between the in-plane magnetic film and the vertical magnetic film is preferably from 10 to 500 Å.

In a second embodiment, the present invention provides a magnetic recording medium comprising a substrate having thereon an in-plane magnetic film having a magnetic easy axis oriented in the in-plane direction with respect to the substrate and a vertical magnetic film having a magnetic easy axis oriented perpendicularly to the substrate, the in-plane magnetic film being disposed closer to the substrate than the vertical magnetic film, a separation film being disposed between the in-plane magnetic film and the vertical magnetic film, and the separation film containing one or more of Ta, Re, CuTi, SiC, W, NiP, Zr, Ti and C as a main component.

In this second embodiment, the separation film preferably has a thickness of from 5 to 200 Å.

A nonmagnetic intermediate layer having an hcp structure is preferably disposed between the separation film and the vertical magnetic film.

Furthermore, an in-plane magnetic film underlayer is preferably disposed at the substrate side of the in-plane magnetic film, and the in-plane magnetic film underlayer preferably contains Cr or an alloy consisting of Cr and one or more of Ti, Mo, W and V, as a main component.

Furthermore, the in-plane magnetic film preferably contains a Co alloy consisting of from 12 to 25 at % of Cr, from 0 to 15 at % of Pt, from 1 to 10 at % of Ta, from 0 to 10 at % of one or more of Zr, Re, Cu and V, and the balance of Co, as a main component.

In a third embodiment, the present invention provides a magnetic recording medium a substrate having thereon an in-plane magnetic film having a magnetic easy axis oriented in the in-plane direction with respect to the substrate, a separation film comprising a material capable of growing non-epitaxially to the in-plane magnetic film, a nonmagnetic intermediate layer having an hcp structure and a vertical magnetic film having a magnetic easy axis oriented perpendicularly to the substrate, the nonmagnetic intermediate layer containing a Co alloy consisting of from 25 to 50 at % of Cr, from 0 to 15 at % of Pt, from 0 to 10 at % of one or more of Ta, Zr, Cu and Re, and the balance of Co, as a main component, and the vertical magnetic film containing a Co alloy consisting of from 16 to 30 at % of Cr, from 0 to 15 at % of Pt, from 2 to 10 at % of Ta, from 0 to 5 at % of Zr and the balance of Co, as a main component.

The nonmagnetic intermediate layer preferably has a thickness of from 20 to 400 Å.

Furthermore, the clearance between the in-plane magnetic film and the vertical magnetic film is preferably from 10 to 500 Å.

DESCRIPTION OF THE PREFERRED EMBODIMENTS

Figure 1:
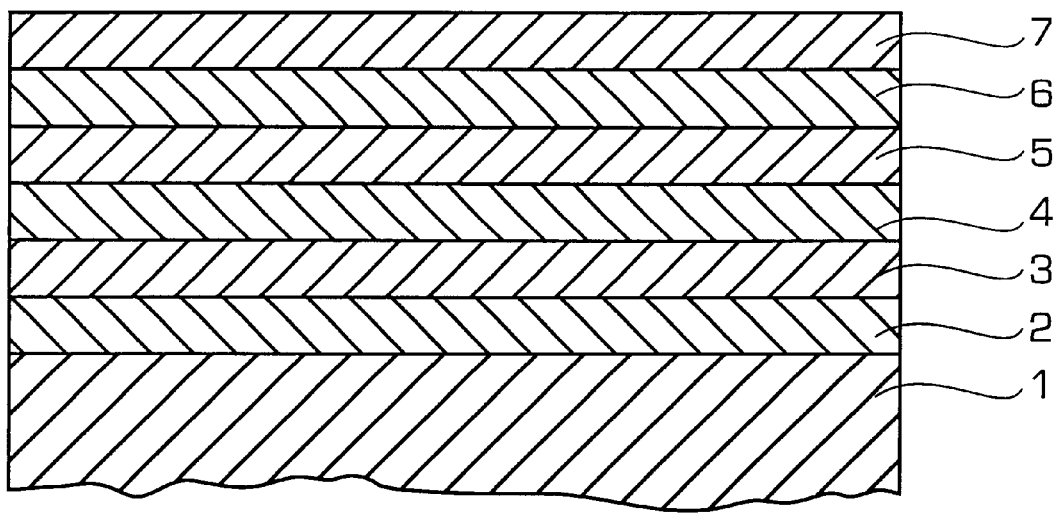
FIG. 1 is a partial cross section showing one example of the magnetic recording medium of the present invention.

FIG. 1 shows an example of the magnetic recording medium of the present invention. The magnetic recording medium comprises a substrate 1 having formed thereon an in-plane magnetic film underlayer 2, an in-plane magnetic film 3, a separation film 4, a nonmagnetic intermediate layer 5, a vertical magnetic film 6 and a protective film 7 in this order.

For the substrate 1, an aluminum alloy having an NiP-plating film, glass or ceramic may be used.

The surface of the substrate 1 may be subjected to texturing such as mechanical texturing.

The in-plane magnetic film underlayer 2 is disposed so as to orient the c-axis of crystals in the in-plane magnetic film 3 toward the in-plane direction. In view of improvement of the crystallographic orientation in the in-plane magnetic film 3, the underlayer is preferably formed from Cr or a Cr alloy containing Cr as a main component, more preferably from Cr, a Cr/Ti system alloy, a Cr/Mo system alloy, a Cr/W system alloy or a Cr/V system alloy.

Specific examples of the in-plane magnetic film underlayer 2 include a Cr alloy consisting of from 1 to 40 at % of Ti, Mo, W or V and the balance of Cr.

The in-plane magnetic film underlayer 2 preferably has a thickness of from 10 to 1,000 Å.

The term "main component" as used in the present invention means that the component is contained in excess of 50 at %.

In the in-plane magnetic film 3, the magnetic easy axis is mainly directed toward the in-plane direction. Specific examples of the material suitable for the in-plane magnetic film 3 include alloys of the Co/Cr system, Co/Cr/Ta system, Co/Cr/Pt/Ta system, Co/Cr/Ni/Pt/Ta system and Co/Cr/Pt/Ta/Zr system.

In particular, a material containing a Co alloy consisting of from 12 to 25 at % of Cr, from 0 to 15 at % of Pt, from 1 to 10 at % of Ta, from 0 to 10 at % of one or more of Zr, Re, Cu and V, and the balance of Co, as a main component is preferred as a material for the in-plane magnetic film 3 in view of improvement of the crystallographic orientation in this film.

The in-plane magnetic film 3 has a coercivity Hc of from 1,500 to 4,000 Oe (preferably from 2,000 to 3,500 Oe).

If the Hc is less than 1,500 Oe, similar to the vertical magnetic recording medium having only a vertical magnetic film, the isolated waveform obtained at the time of reproduction does not form a single peak. It then becomes difficult to apply the signal processing system used for reproduction of a general-purpose in-plane magnetic recording medium.

On the other hand, if the Hc exceeds 4,000 Oe, the recording properties of the in-plane magnetic film 3 readily deteriorate to cause a low reproduction signal output. Furthermore, problems are liable to occur, for example, because the reproduction waveform does not form a satisfactory single peak or the noise increases.

The in-plane magnetic film 3 has a remnant magnetization film thickness product BrT of from 10 to 100 G$\mu$m (second and third embodiments of the invention) or a remnant magnetization film thickness product BrT of from 20 to 100 G$\mu$m (first embodiment of the invention).

If the BrT is less than 20 G$\mu$m, sufficiently high magnetic flux cannot be obtained and similar to the vertical magnetic recording medium having only a vertical magnetic film, the isolated waveform obtained at the time of reproduction does not form a single peak. As a result, it becomes difficult to apply the signal processing system used for reproduction of a general-purpose in-plane magnetic recording medium.

On the other hand, if the BrT exceeds 100 G$\mu$m, similar to the in-plane magnetic recording medium having only an in-plane magnetic film, the medium noise increases. Furthermore, the half value width Pw$_{50}$ of the reproduction pulse output becomes worse, and it is difficult to obtain sufficiently high output.

The BrT of the in-plane magnetic film 3 is more preferably from 20 to 50 G$\mu$m. This is because when the BrT is within this range, the medium noise can be further reduced.

The separation film 4 is disposed to attain good orientation of the c-axis of crystals in the vertical magnetic film 6 toward the direction perpendicular to the substrate. A material capable of growing non-epitaxially to the in-plane magnetic film 3 is used for the separation film 4.

The separation material is preferably a material having a surface free energy higher than the surface free energy of the constituent material of the nonmagnetic intermediate layer 5, or an amorphous material. This is because the crystallographic orientation of the nonmagnetic intermediate layer 5 and vertical magnetic film 6 formed on the separation film 4 can be improved and the medium noise ascribable to disorder in the magnetic anisotropy of the vertical magnetic film 6 can be minimized.

The separation material preferably contains one or more of Ta, Re, CuTi, SiC, W, NiP, Zr, Ti and C as a main component.

The "CuTi" as used herein means an alloy consisting of Cu and Ti. SiC is a material comprising Si and C and NiP is an alloy consisting of Ni and P.

The separation film 4 preferably has a thickness of from 5 to 200 Å.

If the thickness is less than 5 Å, the nonmagnetic intermediate layer 5 formed on the separation film 4 is susceptible to influence of the in-plane magnetic film 3 having a crystallographic orientation toward the in-plane direction at the time of film formation. As a result, the crystallographic orientation may become disordered. In that case, the crystallographic orientation of the vertical magnetic film 6 formed on the nonmagnetic intermediate layer 5 is in turn disordered, and consequently the magnetic recording medium thus obtained suffers from an increase in medium noise.

On the other hand, if the thickness exceeds 200 Å, the clearance between the in-plane magnetic film 3 and the vertical magnetic film 6 increases and the recording properties of the in-plane magnetic film 3 deteriorate at the time of short wavelength recording.

The nonmagnetic intermediate layer 5 is disposed to attain further improved crystallographic orientation of the vertical magnetic film 6. A nonmagnetic material having a hcp structure is used as the nonmagnetic intermediate layer 5, and a Co/Cr system, Co/Cr/Ta system or Co/Cr/Pt/X (X: one or more of Ta, Zr, Cu and Re) system alloy is preferably used.

In particular, a material containing a Co alloy consisting of from 25 to 50 at % of Cr, from 0 to 15 at % of Pt, from 0 to 10 at % of X and the balance of Co, as a main component is preferred as the nonmagnetic intermediate layer.

If the content of each component of the nonmagnetic intermediate layer 5 is not within the above-described range, the crystallographic orientation of the vertical magnetic film 6 is readily disordered due to mismatching of the lattice of the nonmagnetic intermediate layer 5 with the vertical magnetic film 6. In that case, the magnetic anisotropy of the vertical magnetic film 6 may deteriorate to thereby increase the medium noise.

The nonmagnetic intermediate layer 5 may have a single layer structure or may have a multi-layer structure obtained by laminating a plurality of layers each comprising the above-described material.

The nonmagnetic intermediate layer 5 preferably has a thickness of from 20 to 400 Å.

If the thickness is less than 20 Å, the crystallographic orientation of the vertical magnetic film 6 is readily disordered at initial growth in the process of forming the vertical magnetic film 6 on the nonmagnetic intermediate layer 5, and the magnetic recording medium thus obtained may suffer from an increase in medium noise.

On the other hand, if the thickness exceeds 400 Å, the clearance between the in-plane magnetic film 3 and the vertical magnetic film 6 increases and the recording properties of the in-plane magnetic film 3 deteriorate for short wavelength recording.

The total thickness of the separation film 4 and the to nonmagnetic intermediate layer 5, namely, the clearance between the in-plane magnetic film 3 and the vertical magnetic film 6, is preferably from 10 to 500 Å.

If the total thickness is less than 10 Å, the crystallographic orientation of the vertical magnetic film 6 is readily disordered and a sufficiently high coercivity may not be obtained, whereas if it exceeds 500 Å, the clearance between the in-plane magnetic film 3 and the vertical magnetic film 6 increases and the recording properties of the in-plane magnetic film 3 deteriorate at the short wavelength recording.

In the vertical magnetic film 6, the magnetic easy axis is directed mainly toward a direction perpendicular to the substrate. The material which can be used for the vertical magnetic film 6 includes Co/Cr system, Co/Cr/Ta system, Co/Cr/Pt/Ta system, Co/Cr/Ni/Pt/Ta system and Co/Cr/Pt/Ta/Zr system alloys.

In particular, a material containing a Co alloy consisting of from 16 to 30 at % of Cr, from 0 to 15 at % of Pt, from 2 to 10 at % of Ta, from 0 to 5 at % of Zr and the balance of Co, as a main component is preferred as the vertical magnetic film 6.

If the content of each component of the vertical magnetic film 6 is not within the above-described range, the crystallographic orientation of the vertical magnetic film 6 is readily disordered due to mismatching of the lattice of the vertical magnetic film 6 with the nonmagnetic intermediate layer 5. In that case, the medium noise may increase.

The vertical magnetic film 6 has a coercivity Hc of from 1,500 to 4,000 Oe (preferably from 2,000 to 3,500 Oe).

If the Hc is less than 1,500 Oe, the squareness S (=remnant magnetic flux density Br/saturation magnetic flux density Bs) is reduced, the output decreases and the SNR becomes worse.

On the other hand, if the Hc exceeds 4,000 Oe, the recording properties of the vertical magnetic film 6 disadvantageously deteriorate.

The vertical magnetic film 6 has a thickness of from 100 to 1,000 Å.

If the thickness is less than 100 Å, a sufficiently high magnetic flux cannot be obtained and similar to the in-plane magnetic recording medium having only an in-plane magnetic film, the medium noise increases. Furthermore, the half value width $Pw_{50}$ of the reproduction pulse output becomes worse and sufficiently high output can be difficult to obtain.

On the other hand, if the thickness exceeds 1,000 Å, the isolated waveform obtained at reproduction does not form a single peak, and it becomes difficult to apply a signal processing system used in reproduction of a general-purpose in-plane magnetic recording medium.

The thickness of the vertical magnetic film 6 is more preferably from100to 600 Å. This is because when the thickness is within this range, the formation of coarse magnetic particles in the vertical magnetic film 6 can be prevented and the noise Is properties can be further improved.

The protective film 7 is preferably formed from carbon, and preferably has a thickness of from 20 to 100 Å.

A lubricating film comprising a perfluoropolyether (PFPE) or the like may also be formed on the protective film 7.

In the manufacture of a magnetic recording medium having the above-described structure, the layers from the nonmagnetic underlayer 2 to the vertical magnetic film 6 can be formed on the substrate 1 by sputtering, vacuum evaporation, ion plating or metal plating. Subsequently, the protective film 7 can be formed by sputtering, a plasma CVD method, an ion beam method or the like.

In the case of forming a lubricating film on the protective film 7, a dipping method or the like may be used.

In an example of a magnetic recording medium of the first embodiment of the invention having the above-described structure, an in-plane magnetic film 3 and a vertical magnetic film 6 are provided. The in-plane magnetic film 3 has a coercivity Hc of from 1,500 to 4,000 Oe and a remnant magnetization film thickness product BrT of from 20 to 100 G$\mu$m, and the vertical magnetic film 6 has a coercivity Hc of from 1,500 to 4,000 Oe and a thickness of from 100 to 1,000 Å. By virtue of this constitution, the isolated waveform obtained at reproduction does not form a di-pulse, the signal processing system used in the reproduction of general-purpose in-plane magnetic recording media can be applied, and good noise properties can be obtained while reducing the medium noise ascribable to the expansion of the reversal magnetization transition region or the grain noise resulting from formation of magnetic coarse particles.

Furthermore, by interposing a separation film 4 comprising a material capable of growing non-epitaxially to the in-plane magnetic film 3 between the in-plane magnetic film 3 and the vertical magnetic film 6, the perpendicular orientation of the nonmagnetic intermediate layer 5 and vertical magnetic film 6 formed on the separation film 4 can be improved, the magnetic anisotropy of the vertical magnetic film 6 can be increased, and the medium noise can be reduced.

On the other hand, if a material which grows epitaxially to the in-plane magnetic film 3 is used for the separation film 4, the orientation of the vertical magnetic film 6 may be disordered by the effect of the in-plane magnetic film 3 having in-plane anisotropy.

Also, by interposing a nonmagnetic intermediate layer having an hcp structure between the separation film and the vertical magnetic film, disorder in the orientation at initial growing of the vertical magnetic film 6 can be prevented, the magnetic anisotropy can be increased and the medium noise can be reduced.

In an example of the magnetic recording medium of the second embodiment of the invention having the above-described structure, a separation film 4 is interposed between the in-plane magnetic film 3 and the vertical magnetic film 6. The separation film 4 contains one or more of Ta, Re, CuTi, SiC, W, NiP, Zr, Ti and C as a main component. By virtue of this constitution, the orientation in the perpendicular direction of the nonmagnetic intermediate layer 5 and vertical magnetic film 6 formed on the separation film 4 can be improved, the magnetic anisotropy of the vertical magnetic film 6 can be increased, and the medium noise can be reduced.

The reason why the magnetic anisotropy can be improved when the separation film 4 is formed from the above-described material is not clearly known, however, the following mechanism is considered to participate in this effect.

In the case where SiC, NiP or C is used as the material for the separation film 4, a dangling bond, namely, an unsaturated bond of an atomic group in the periphery of a lattice defect on the surface or inside of the separation film 4, intensifies the bonding strength between the separation film 4 and the nonmagnetic intermediate layer 5 formed thereon. As a result, the crystallographic orientation at the initial growing of the nonmagnetic intermediate layer 5 is improved, the nonmagnetic intermediate layer 5 can have excellent crystallographic orientation in the perpendicular direction, and in turn, the magnetic anisotropy of the vertical magnetic film 6 formed on the nonmagnetic intermediate layer 5 is improved.

Furthermore, the above-described material can grow non-epitaxially to the in-plane magnetic film 3. Accordingly, the orientation of the nonmagnetic intermediate layer 5 and the orientation of the vertical magnetic film 6 are hardly disordered due to the effect of the in-plane magnetic film 3 having in-plane anisotropy.

In the case where Ta, Re, W, CuTi, Ti or Zr is used as the material for the separation film 4, these materials have a surface free energy higher than the surface free energy of the constituent material (for example, Co alloy) of the nonmagnetic intermediate layer 5. Accordingly, the nonmagnetic intermediate layer 5 can be easily (002) oriented at the film formation. This is because when the nonmagnetic intermediate layer 5 in contact with the separation film 4 is (002) oriented, the total surface energy on the interface between the separation film 4 and the nonmagnetic intermediate layer 5 is minimized. The improvement in orientation of the nonmagnetic intermediate layer 5 effects an improvement in orientation of the vertical magnetic film 6 which grows epitaxially to the intermediate layer.

The magnetic anisotropy of the vertical magnetic film 6 is considered to be elevated by the mechanism described above.

Still further, by virtue of a constitution where the in-plane magnetic film underlayer 2 comprises Cr or an alloy consisting of Cr and one or more of Ti, Mo, W and V and the in-plane magnetic film 3 contains a Co alloy consisting of from 1 to 25 at % of Cr, from 0 to 15 at % of Pt, from 1 to 10 at % of Ta, from 0 to 10 at % of one or more of Zr, Re, Cu and V, and the balance of Co, as a main component, the in-plane magnetic film 3 can have good crystallographic orientation and the magnetic recording medium thus obtained can have reduced medium noise.

When a nonmagnetic intermediate layer 5 having an hcp structure is interposed between the separation film 4 and the vertical magnetic film 6, disorder in the orientation at initial growth of the vertical magnetic film 6 comprising a Co alloy or the like having the same hcp structure can be prevented, the magnetic anisotropy thereof can be elevated, and the medium noise can be reduced.

In an example of the magnetic recording medium of the third embodiment of the invention having the above-described structure, an in-plane magnetic film underlayer 2, an in-plane magnetic film 3, a separation film 4 a nonmagnetic intermediate layer 5 and a vertical magnetic film 6 are formed. The nonmagnetic intermediate layer 5 comprises a Co alloy consisting of from 25 to 50 at % of Cr, from 0 to 15 at % of Pt, from 0 to at % of one or more of Ta, Zr, Cu and Re, and the balance of Co. The vertical magnetic film 6 formed thereon comprises a Co alloy consisting of from 16 to 30 at % of Cr, from 0 to 15 at % of Pt, from 2 to 10 at % of Ta, from 0 to 5 at % of Zr and the balance of Co. By virtue of this constitution, the crystallographic orientation of the vertical magnetic film 6 formed on the nonmagnetic intermediate layer 5 is improved.

As a result, the isolated waveform obtained at reproduction does not form a di-pulse, the signal processing system used in reproduction of a general-purpose in-plane magnetic recording medium can be applied, and good noise properties can be obtained while reducing the medium noise ascribable to expansion of the magnetization reversal transition region.

EXAMPLES

Test Example 1

The surface of an aluminum alloy substrate (diameter: 84 is mm, thickness: 0.8 mm) having formed on the surface thereof an NiP plating film (thickness: 15 $\mu$m) was subjected to mechanical texturing to have a surface average roughness Ra of 15 Å. The resulting substrate 1 was set in a chamber of a DC magnetron sputtering device (3010, manufactured by ANELVA).

The chamber was evacuated until the ultimate vacuum reached $2 \times 10^{-7}$ Pa, the substrate 1 was heated to 200° C., and then on the substrate 1, an in-plane magnetic film underlayer 2 (thickness: 500 Å) comprising Cr-15 at %, Ti-3 at % and Mo (hereinafter referred to as Cr15Ti3Mo), an in-plane magnetic film 3 comprising Co-13 at %, Cr-6 at %, Pt-3 at % and Ta (Co13Cr6Pt3Ta), a separation film 4 comprising carbon, a nonmagnetic intermediate layer 5 comprising Co-40 at % and Cr (Co40Cr) and a vertical magnetic film 6 comprising Co-18 at %, Cr-6 at %, Pt-3 at % and Ta (Co18Cr6Pt3Ta) were sequentially formed by sputtering.

Subsequently, a carbon protective film having a thickness of 100 Å was formed on the vertical magnetic film 6, and then a lubricant was coated on the carbon protective film to form a lubricating film (thickness: 20 Å) comprising PFPE, to thereby obtain a magnetic recording medium.

Test Examples 2 to 4

Magnetic recording media were manufactured by changing the substrate heating temperature at film formation, to thereby vary the coercivity Hc of the in-plane magnetic film 3.

Test Examples 5 to 10

Magnetic recording media were manufactured by varying the BrT of the in-plane magnetic film 3.

Test Examples 11 to 19

Magnetic recording media were manufactured by varying the coercivity Hc or thickness of the vertical magnetic film 6.

Test Example 20

A magnetic recording medium was manufactured in the same manner as in Test Example 16, except that a separation film 4 was not formed.

Test Example 21

A magnetic recording medium was manufactured in the same manner as in Test Example 16, except that a nonmagnetic intermediate layer 5 was not formed.

Test Example 22

A magnetic recording medium was manufactured in the same manner as in Test Example 16, except that a separation film 4 and a nonmagnetic intermediate layer 5 were not formed.

The magnetic recording media of the respective Test Examples were evaluated with respect to magnetostatic properties using vibrating sample magnetometry (VSM). Furthermore, these magnetic recording media were evaluated with respect to recording and reproducing properties using a composite type thin film magnetic head having a magnetoresistive (MR) element in a reproduction unit at a linear recording density of 240 kFCI. The results obtained are shown in Table 1.

In the measurement of SNR (signal noise ratio), the signal was determined with the isolated wave being the measuring object.

TABLE 1

| | In-plane Magnetic Film | In-plane Magnetic Film | | | Separation Film | | Nonmagnetic Intermediate Layer | | Vertical Magnetic Film | | | Reproduction Properties |
|---|---|---|---|---|---|---|---|---|---|---|---|---|
| | Underlayer Composition | Composition | BrT (G$\mu$m) | Hc (Oe) | Composition | Thickness (Å) | Composition | Thickness (Å) | Composition | Thickness (Å) | Hc (Oe) | SNR (dB) |
| Test Example 1 | Cr15Ti3Mo | Co13Cr6Pt3Ta | 50 | 645 | C | 15 | Co40Cr | 200 | Co18Cr6Pt3Ta | 300 | 1800 | 13.5 |
| Test Example 2 | Cr15Ti3Mo | Co13Cr6Pt3Ta | 50 | 2300 | C | 15 | Co40Cr | 200 | Co18Cr6Pt3Ta | 300 | 2300 | 15.4 |
| Test Example 3 | Cr15Ti3Mo | Co13Cr6Pt3Ta | 50 | 2830 | C | 15 | Co40Cr | 200 | Co18Cr6Pt3Ta | 300 | 2520 | 15.7 |
| Test Example 4 | Cr15Ti3Mo | Co13Cr10Pt3Ta | 50 | 4100 | C | 15 | Co40Cr | 200 | Co18Cr6Pt3Ta | 300 | 2250 | 14.2 |
| Test Example 5 | Cr15Ti3Mo | Co13Cr6Pt3Ta | 15 | 540 | C | 15 | Co40Cr | 200 | Co18Cr6Pt3Ta | 300 | 2010 | 13.2 |
| Test Example 6 | Cr15Ti | Co13Cr6Pt3Ta | 50 | 1800 | C | 15 | Co40Cr | 200 | Co18Cr6Pt3Ta | 300 | 2350 | 15.8 |
| Test Example 7 | Cr15Ti | Co13Cr6Pt3Ta | 30 | 1595 | C | 15 | Co40Cr | 200 | Co18Cr6Pt3Ta | 300 | 2300 | 16.3 |
| Test Example 8 | Cr15Ti3Mo | Co13Cr6Pt3Ta | 100 | 2309 | C | 15 | Co40Cr | 200 | Co18Cr6Pt3Ta | 300 | 2250 | 13.3 |
| Test Example 9 | Cr15Ti3Mo | Co13Cr6Pt3Ta | 150 | 2462 | C | 15 | Co40Cr | 200 | Co18Cr6Pt3Ta | 300 | 2350 | 12.5 |
| Test Example 10 | Cr15Ti3Mo | Co13Cr6Pt3Ta | 200 | 2385 | C | 15 | Co40Cr | 200 | Co18Cr6Pt3Ta | 300 | 2300 | 11.3 |
| Test Example 11 | Cr15Ti3Mo | Co13Cr6Pt3Ta | 50 | 1595 | C | 15 | Co40Cr | 200 | Co18Cr6Pt3Ta | 300 | 726 | 11.3 |
| Test Example 12 | Cr15Ti3Mo | Co13Cr6Pt3Ta | 50 | 1595 | C | 15 | Co40Cr | 200 | Co18Cr6Pt3Ta | 300 | 1726 | 14.1 |
| Test Example 13 | Cr15Ti3Mo | Co13Cr6Pt3Ta | 50 | 1595 | C | 15 | Co40Cr | 200 | Co18Cr6Pt3Ta | 300 | 2362 | 15.4 |
| Test Example 14 | Cr15Ti3Mo | Co13Cr6Pt3Ta | 50 | 1595 | C | 15 | Co40Cr | 200 | Co18Cr6Pt3Ta | 50 | 726 | 11.5 |
| Test Example 15 | Cr15Ti3Mo | Co13Cr6Pt3Ta | 50 | 1595 | C | 15 | Co40Cr | 200 | Co18Cr6Pt3Ta | 100 | 1950 | 15.0 |
| Test Example 16 | Cr15Ti3Mo | Co13Cr6Pt3Ta | 50 | 1595 | C | 15 | Co40Cr | 200 | Co18Cr6PtTa | 300 | 2350 | 15.4 |
| Test Example 17 | Cr15Ti3Mo | Co13Cr6Pt3Ta | 50 | 1595 | C | 15 | Co40Cr | 200 | Co18Cr6Pt3Ta | 500 | 2530 | 15.6 |
| Test Example 18 | Cr15Ti3Mo | Co13Cr6Pt3Ta | 50 | 1595 | C | 15 | Co40Cr | 200 | Co18Cr6Pt3Ta | 1000 | 2400 | 13.7 |
| Test Example 19 | Cr15Ti3Mo | Co13Cr6Pt3Ta | 50 | 1595 | C | 15 | Co40Cr | 200 | Co18Cr6Pt3Ta | 1500 | 2461 | 13.0 |
| Test Example 20 | Cr15Ti3Mo | Co13Cr6Pt3Ta | 50 | 1595 | — | — | Co40Cr | 200 | Co18Cr6Pt3Ta | 300 | 440 | 12.5 |
| Test Example 21 | Cr15Ti3Mo | Co13Cr6Pt3Ta | 50 | 1595 | C | 15 | — | — | Co18Cr6Pt3Ta | 300 | 1450 | 13.5 |

TABLE 1-continued

| | In-plane Magnetic Film | In-plane Magnetic Film | | | Separation Film | | Nonmagnetic Intermediate Layer | | Vertical Magnetic Film | | | Reproduction |
|---|---|---|---|---|---|---|---|---|---|---|---|---|
| | Underlayer Composition | Composition | BrT (Gμm) | Hc (Oe) | Composition | Thickness (Å) | Composition | Thickness (Å) | Composition | Thickness (Å) | Hc (Oe) | Properties SNR (dB) |
| Test Example 22 | Cr15Ti3Mo | Co13Cr6Pt3Ta | 50 | 1595 | — | — | — | — | Co18Cr6Pt3Ta | 300 | 410 | 12.4 |

It is seen from Table 1 that the magnetic recording media of Test Examples 2 and 3 in which the coercivity Hc of the in-plane magnetic film was from 1,500 to 4,000 Oe exhibited excellent noise properties as compared with the magnetic recording medium of Test Example 4 in which the coercivity Hc exceeded that range.

Furthermore, the recording media of Test Examples 2 and 3 provided a single peak isolated waveform at reproduction, whereas the magnetic recording medium of Test Example 1 in which the coercivity Hc was below the above-described range provided an isolated waveform containing a di-pulse waveform at reproduction but did not form a single peak waveform.

It is also seen that the magnetic recording media of Test Examples 6 to 8 in which the remnant magnetization film thickness product BrT of the in-plane magnetic film 3 was from 20 to 100 Gμm exhibited excellent noise properties as compared with the magnetic recording media of Test Examples 9 and 10 in which the BrT exceeded that range. In particular, the magnetic recording media of Test Examples 6 and 7 in which the BrT was from 20 to 50 Gμm exhibited more excellent noise properties.

Furthermore, the recording media of Test Examples 6 to 8 provided a single peak solitary waveform at reproduction, whereas the magnetic recording medium of Test Example 5 in which the BrT was below the above-described range provided an isolated waveform containing a di-pulse waveform at reproduction but did not form a single peak waveform.

It is also seen that the magnetic recording media of Test Examples 12 and 13 in which the coercivity of the vertical magnetic film 6 was 1,500 Oe or more exhibited excellent noise properties as compared with the magnetic recording medium of Test Example 11 in which the coercivity Hc was less than 1,500 Oe.

It is also seen that the magnetic recording media of Test Examples 15 to 18 in which the thickness of the vertical magnetic film 6 was from 100 to 1,000 Å exhibited excellent noise properties as compared with the magnetic recording media of Test Examples 14 and 19 in which the thickness of the vertical magnetic film 6 was not within that range. In particular, the magnetic recording media of Test Examples 15 and 16 in which the thickness was from 100 to 600 Å exhibited more excellent noise properties.

It is also seen that the magnetic recording media having a separation film 4 exhibited excellent noise properties as compared with the magnetic recording media of Test Examples 20 and 22 in which a separation film 4 was not formed.

Furthermore, it is seen that the magnetic recording media having a nonmagnetic intermediate layer 5 exhibited excellent noise properties as compared with the magnetic recording media of Test Examples 21 and 22 in which a nonmagnetic intermediate layer 5 was not formed.

Test Example 23

The surface of an aluminum alloy substrate (diameter: 84 mm, thickness: 0.8 mm) having formed on the surface thereof an NiP plating film (thickness: 15 μm) was subjected to mechanical texturing to have a surface average roughness Ra of 15 Å. The resulting substrate 1 was set in a chamber of a DC magnetron sputtering device (3010, manufactured by ANELVA).

The chamber was evacuated until the ultimate vacuum reached $2 \times 10^{-7}$ Pa, the substrate 1 was heated to 200° C., and then on the substrate 1, an in-plane magnetic film underlayer 2 (thickness: 200 Å), an in-plane magnetic film 3, a separation film 4, a nonmagnetic intermediate layer 5 comprising Co-40 at % and Cr (Co40Cr) and a vertical magnetic film 6 comprising Co-18 at %, Cr-6 at %, Pt-3 at % and Ta (Co18Cr6Pt3Ta) were sequentially formed by sputtering.

Subsequently, a carbon protective film having a thickness of 100 Å was formed on the vertical magnetic film 6, and then a lubricant was coated on the carbon protective film to form a lubricating film (thickness: 20 Å) comprising PFPE, to thereby obtain a magnetic recording medium.

Test Examples 24 to 39

Magnetic recording media were manufactured in the same manner as in Test Example 23, except for the changes indicated in Table 2 below.

Test Examples 40 and 41

Magnetic recording media were manufactured in the same manner as in Test Example 23, except that a separation film 4 or a nonmagnetic intermediate layer 5 was not formed.

The magnetic recording media of the respective Test Examples were evaluated in the same manner as Test Examples 1 to 22. The results are set forth in Table 2 below.

TABLE 2

| | In-plane Magnetic Film | In-plane Magnetic Film | | | Separation Film | | Nonmagnetic Intermediate Layer | | Vertical Magnetic Film | | | Reproduction |
|---|---|---|---|---|---|---|---|---|---|---|---|---|
| | Underlayer Composition | Composition | BrT (Gμm) | Hc (Oe) | Composition | Thickness (Å) | Composition | Thickness (Å) | Composition | Thickness (Å) | Hc (Oe) | Properties SNR (dB) |
| Test Example 23 | Cr | Co17Cr5Ta | 50 | 1800 | C | 20 | Co40Cr | 200 | Co18Cr6Pt3Ta | 500 | 2550 | 14.8 |
| Test Example 24 | Cr | Co17Cr5Ta | 50 | 1800 | C | 50 | Co40Cr | 200 | Co18Cr6Pt3Ta | 500 | 2670 | 15.3 |
| Test Example 25 | Cr | Co17Cr5Ta | 50 | 1800 | Ta | 50 | Co40Cr | 200 | Co18Cr6Pt3Ta | 500 | 2150 | 14.3 |
| Test Example 26 | Cr | Co17Cr5Ta | 50 | 1800 | Ta | 100 | Co40Cr | 200 | Co18Cr6Pt3Ta | 500 | 2245 | 14.6 |
| Test Example 27 | Cr | Co17Cr5Ta | 50 | 1800 | NiP | 50 | Co40Cr | 200 | Co18Cr6Pt3Ta | 500 | 1950 | 14.3 |
| Test Example 28 | Cr | Co17Cr5Ta | 50 | 1800 | W | 50 | Co40Cr | 200 | Co18Cr6Pt3Ta | 500 | 2315 | 14.9 |
| Test Example 29 | Cr | Co17Cr5Ta | 50 | 1800 | Re | 50 | Co40Cr | 200 | Co18Cr6Pt3Ta | 500 | 2435 | 15.4 |
| Test Example 30 | Cr | Co17Cr5Ta | 50 | 1800 | CuTi | 50 | Co40Cr | 200 | Co18Cr6Pt3Ta | 500 | 2050 | 14.4 |
| Test Example 31 | Cr | Co17Cr5Ta | 50 | 1800 | SiC | 50 | Co40Cr | 200 | Co18Cr6Pt3Ta | 500 | 2250 | 14.8 |
| Test Example 32 | Cr | Co17Cr5Ta | 50 | 1800 | Ti | 50 | Co40Cr | 200 | Co18Cr6Pt3Ta | 500 | 2450 | 14.7 |
| Test Example 33 | Cr | Co17Cr5Ta | 50 | 1800 | Zr | 50 | Co40Cr | 200 | Co18Cr6Pt3Ta | 500 | 2350 | 15.0 |
| Test Example 34 | Cr | Co17Cr5Ta | 50 | 1800 | C | 2 | Co40Cr | 200 | Co18Cr6Pt3Ta | 500 | 780 | 11.0 |
| Test Example 35 | Cr | Co17Cr5Ta | 50 | 1800 | W | 300 | Co40Cr | 400 | Co18Cr6Pt3Ta | 500 | 2350 | 13.9 |
| Test Example 36 | Cr15Ti3Mo | Co18Cr5Pt2Ta2Zr | 50 | 2200 | C | 20 | Co40Cr | 200 | Co18Cr6Pt3Ta | 500 | 2720 | 15.9 |
| Test Example 37 | Cr15W | Co20Cr8Pt2Ta3Zr | 50 | 2000 | C | 20 | Co40Cr | 200 | Co18Cr6Pt3Ta | 500 | 2820 | 16.1 |
| Test Example 38 | Cr15V | Co17Cr8Pt3Ta | 50 | 1900 | C | 20 | Co40Cr | 200 | Co18Cr6Pt3Ta | 500 | 2650 | 15.4 |
| Test Example 39 | Cr4Ti | Co19Cr6Pt2Ta2Re | 50 | 2000 | C | 20 | Co40Cr | 200 | Co18Cr6Pt3Ta | 500 | 2520 | 15.6 |
| Test Example 40 | Cr | Co17Cr5Ta | 50 | 1800 | — | — | Co40Cr | 200 | Co18Cr6Pt3Ta | 500 | 435 | 10.3 |
| Test Example 41 | Cr | Co17Cr5Ta | 50 | 1800 | C | 20 | — | — | Co18Cr6Pt3Ta | 500 | 1850 | 12.6 |

It is seen from Table 2 that the magnetic recording media in which a separation film 4 comprising Ta, Re, CuTi, SiC, W, NiP, Zr, Ti or C was formed exhibited excellent noise properties.

Furthermore, the recording medium of Test Example 34 in which the thickness of the separation film 4 was 2 Å formed an isolated waveform slightly containing a di-pulse waveform at reproduction, however, the magnetic recording media of the other Test Examples provided a single peak isolated waveform.

Test Example 42

The surface of an aluminum alloy substrate (diameter: 84 mm, thickness: 0.8 mm) having formed on the surface thereof an NiP plating film (thickness: 15 μm) was subjected to mechanical texturing to have a surface average roughness Ra of 15 Å. The resulting substrate 1 was set in a chamber of a DC magnetron sputtering device (3010, manufactured by ANELVA).

The chamber was evacuated until the ultimate vacuum reached $2 \times 10^{-7}$ Pa, the substrate 1 was heated to 200° C. and then on the substrate 1, an in-plane magnetic film underlayer 2 (thickness: 200 Å) comprising Cr, an in-plane magnetic film 3 comprising Co-17 at %, Cr-5 at % and Ta (Co17Cr5Ta), a separation film 4 comprising carbon, a nonmagnetic intermediate layer 5 comprising Co-40 at % and Cr (Co40Cr) and a vertical magnetic film 6 comprising Co-18 at %, Cr-6 at %, Pt-3 at % and Ta (Co18Cr6Pt3Ta) were sequentially formed by sputtering.

Subsequently, a carbon protective film having a thickness of 100 Å was formed on the vertical magnetic film 6. A lubricant was then coated on the carbon protective film to form a lubricating film (thickness: 20 Å) comprising PFPE, to thereby obtain a magnetic recording medium.

Test Examples 43 to 50

Magnetic recording media were manufactured in the same manner as Test Example 42, except for changing the constituent material of the nonmagnetic intermediate layer 5 as shown in Table 3.

Test Examples 51 to 59

Magnetic recording media were manufactured by varying the constituent material of the vertical magnetic film 6 as shown in Table 4.

Test Examples 60 to 63

Magnetic recording media were manufactured by varying the thickness of the nonmagnetic intermediate layer 5 as shown in Table 5.

The magnetic recording media of the respective Test Examples were evaluated in the same manner as Test Example 1 to 42. The results are set forth in Tables 3 to 5 below.

TABLE 3

| | In-plane Magnetic Film | In-plane Magnetic Film | | | Separation Film | | Nonmagnetic Intermediate Layer | | Vertical Magnetic Film | | | Reproduction Properties |
|---|---|---|---|---|---|---|---|---|---|---|---|---|
| | Underlayer Composition | Composition | BrT (Gμm) | Hc (Oe) | Composition | Thickness (Å) | Composition | Thickness (Å) | Composition | Thickness (Å) | Hc (Oe) | SNR (dB) |
| Test Example 42 | Cr | Co17Cr5Ta | 50 | 2015 | C | 25 | Co40Cr | 200 | Co18Cr6Pt3Ta | 300 | 2580 | 13.5 |
| Test Example 43 | Cr | Co17Cr5Ta | 50 | 2015 | C | 25 | Co25Cr10Pt3Ta | 200 | Co18Cr6Pt3Ta | 300 | 2730 | 14.3 |
| Test Example 44 | Cr | Co17Cr5Ta | 50 | 2015 | C | 25 | Co30Cr8Pt3Zr | 200 | Co18Cr6Pt3Ta | 300 | 2690 | 14.0 |
| Test Example 45 | Cr | Co17Cr5Ta | 50 | 2015 | C | 25 | Co35Cr5Pt3Ta2Cu | 200 | Co18Cr6Pt3Ta | 300 | 2815 | 14.9 |
| Test Example 46 | Cr | Co17Cr5Ta | 50 | 2015 | C | 25 | Co35Cr5Pt2Ta2Re | 200 | Co18Cr6Pt3Ta | 300 | 2735 | 15.6 |
| Test Example 47 | Cr | Co17Cr5Ta | 50 | 2015 | C | 25 | Co40Cr3Pt2Re | 200 | Co18Cr6Pt3Ta | 300 | 2645 | 14.1 |
| Test Example 48 | Cr | Co17Cr5Ta | 50 | 2015 | C | 25 | Co65Cr5Ta | 200 | Co18Cr6Pt3Ta | 300 | 1500 | 12.1 |
| Test Example 49 | Cr | Co17Cr5Ta | 50 | 2015 | C | 25 | Co10Cr2Pt | 200 | Co18Cr6Pt3Ta | 300 | 2200 | 10.5 |
| Test Example 50 | Cr | Co17Cr5Ta | 50 | 2015 | C | 25 | Co60Cr20Pt15Ta | 200 | Co18Cr6Pt3Ta | 300 | 1750 | 11.8 |

TABLE 4

| | In-plane Magnetic Film | In-plane Magnetic Film | | | Separation Film | | Nonmagnetic Intermediate Layer | | Vertical Magnetic Film | | | Reproduction Properties |
|---|---|---|---|---|---|---|---|---|---|---|---|---|
| | Underlayer Composition | Composition | BrT (Gμm) | Hc (Oe) | Composition | Thickness (Å) | Composition | Thickness (Å) | Composition | Thickness (Å) | Hc (Oe) | SNR (dB) |
| Test Example 51 | Cr | Co17Cr5Ta | 50 | 2015 | C | 15 | Co40Cr | 200 | Co20Cr8Pt4Ta | 300 | 2195 | 15.2 |
| Test Example 52 | Cr | Co17Cr5Ta | 50 | 2015 | C | 15 | Co40Cr | 200 | Co25Cr10Pt2Ta | 400 | 1760 | 15.3 |
| Test Example 53 | Cr | Co17Cr5Ta | 50 | 2015 | C | 15 | Co40Cr | 200 | Co22Cr9Pt3Zr | 400 | 1895 | 15.1 |
| Test Example 54 | Cr | Co17Cr5Ta | 50 | 2015 | C | 15 | Co40Cr | 200 | Co18Cr5Pt4Ta2Zr | 300 | 2850 | 15.6 |
| Test Example 55 | Cr | Co17Cr5Ta | 50 | 2015 | C | 15 | Co40Cr | 200 | Co22Cr10Pt2Ta2Zr | 500 | 1975 | 16.1 |
| Test Example 56 | Cr | Co17Cr5Ta | 50 | 2015 | C | 15 | Co40Cr | 200 | Co38Cr6Pt3Ta | 300 | 525 | 10.1 |
| Test Example 57 | Cr | Co17Cr5Ta | 50 | 2015 | C | 15 | Co40Cr | 200 | Co35Cr16Pt5Ta | 300 | 610 | 9.5 |
| Test Example 58 | Cr | Co17Cr5Ta | 50 | 2015 | C | 15 | Co40Cr | 200 | Co30Cr10Pt15Zr | 300 | 725 | 10.3 |
| Test Example 59 | Cr | Co17Cr5Ta | 50 | 2015 | C | 15 | Co40Cr | 200 | Co30Cr5Pt15Ta | 300 | 253 | 8.1 |

TABLE 5

| | In-plane Magnetic Film Underlayer Composition | In-plane Magnetic Film Composition | In-plane Magnetic Film BrT (Gμm) | In-plane Magnetic Film Hc (Oe) | Separation Film Composition | Separation Film Thickness (Å) | Nonmagnetic Intermediate Layer Composition | Nonmagnetic Intermediate Layer Thickness (Å) | Vertical Magnetic Film Composition | Vertical Magnetic Film Thickness (Å) | Vertical Magnetic Film Hc (Oe) | Reproduction Properties SNR (dB) |
|---|---|---|---|---|---|---|---|---|---|---|---|---|
| Test Example 60 | Cr | Co17Cr5Ta | 50 | 2015 | C | 15 | Co35Cr8Pt3Ta | 15 | Co19Cr6Pt3Ta2Zr | 300 | 870 | 9.5 |
| Test Example 61 | Cr | Co17Cr5Ta | 50 | 2015 | C | 15 | Co35Cr8Pt3Ta | 100 | Co19Cr6Pt3Ta2Zr | 300 | 1980 | 14.3 |
| Test Example 62 | Cr | Co17Cr5Ta | 50 | 2015 | C | 15 | Co35Cr8Pt3Ta | 200 | Co19Cr6Pt3Ta2Zr | 300 | 2310 | 15.2 |
| Test Example 63 | Cr | Co17Cr5Ta | 50 | 2015 | C | 15 | Co35Cr8Pt3Ta | 600 | Co19Cr6Pt3Ta2Zr | 300 | 2200 | 13.1 |

It is seen from Tables 3 to 5 that the magnetic recording media in which the nonmagnetic intermediate layer 5 was formed from a Co alloy consisting of from 25 to 50 at % of Cr, from 0 to 15 at % of Pt, from 0 to 10 at % of one or more of Ta, Zr, Cu and Re and the balance of Co and the vertical magnetic film 6 was formed from a Co alloy consisting of from 16 to 30 at % of Cr, from 0 to 15 at % of Pt, from 2 to 10 at % of Ta, from 0 to 5 at % of Zr and the balance of Co exhibited excellent noise properties as compared with the magnetic recording media in which the component ratio in the nonmagnetic intermediate layer 5 or the vertical magnetic film was not within the above-described range. Also, the magnetic recording media formed a satisfactory single peak signal waveform.

Furthermore, the recording media in which the thickness of the nonmagnetic intermediate layer 5 was from 20 to 200 Å and the clearance between the in-plane magnetic film 3 and the vertical magnetic film 6 was from 10 to 500 Å exhibited excellent noise properties and formed a complete single peak isolated waveform at reproduction. On the other hand, the magnetic recording media in which the thickness of the nonmagnetic intermediate layer 5 and the clearance between the in-plane magnetic film 3 and the vertical magnetic film 6 were not within the above-described range had a slightly reduced coercivity or the single peak tendency of the signal wave was slightly reduced.

As describe in the foregoing, the recording medium of the present invention enables application of a signal processing system used in the reproduction of general-purpose in-plane magnetic recording media and ensures excellent noise properties.

While the invention has been described in detail and with reference to specific embodiment thereof, it will be apparent to one skilled in the art that various changes and modifications can made therein without departing from the spirit and scope

What is claimed is:

1. A magnetic recording medium comprising a substrate having thereon an in-plane magnetic film underlayer, an in-plane magnetic film having a magnetic easy axis oriented in the in-plane direction with respect to the substrate, a vertical magnetic film having a magnetic easy axis oriented perpendicularly to the substrate and a separation film being disposed between said in-plane magnetic film and said vertical magnetic film, said in-plane magnetic film underlayer disposed at the substrate side of said in-plane magnetic film, said in-plane magnetic film being disposed closer to the substrate than said vertical magnetic film and having a coercivity Hc of from 1,500 to 4,000 Oe and a remnant magnetization film thickness product BrT of from 20 to 100 Gμm, and said vertical magnetic film having a coercivity He of from 1,500 to 4,000 Oe and a thickness of from 100 to 1,000 Å and containing a Co alloy consisting of from 16 to 30 at % of Cr, from 0 to 15 at % of Pt, from 2 to 10 at % of Ta, from 0 to 5 at % of Zr and the balance of Co, as a main component.

2. The magnetic recording medium as claimed in claim 1, wherein said vertical magnetic film has a thickness of from 100 to 600 Å.

3. The magnetic recording medium as claimed in claim 1, wherein said in-plane magnetic film has a remnant magnetization film thickness product BrT of from 20 to 50 Gμm.

4. The magnetic recording medium as claimed in claim 2, wherein said in-plane magnetic film has a remnant magnetization film thickness product BrT of from 20 to 50 Gμm.

5. The magnetic recording medium as claimed in claim 1, further comprising a separation film comprising a material capable of growing non-epitaxially to said in-plane magnetic film disposed between said in-plane magnetic film and said vertical magnetic film.

6. The magnetic recording medium as claimed in claim 5, wherein said separation film has a thickness of from 5 to 200 Å.

7. The magnetic recording medium as claimed in claim 5, further comprising a nonmagnetic intermediate layer having an hcp structure disposed between said separation film and said vertical magnetic film.

8. The magnetic recording medium as claimed in claim 6, further comprising a nonmagnetic intermediate layer having an hcp structure disposed between said separation film and said vertical magnetic film.

9. The magnetic recording medium as claimed in claim 1, wherein the clearance between said in-plane magnetic film and said vertical magnetic film is from 10 to 500 Å.

10. A magnetic recording medium comprising a substrate having thereon an in-plane magnetic film underlayer, an in-plane magnetic film having a magnetic easy axis oriented in the in-plane direction with respect to the substrate and a vertical magnetic film having a magnetic easy axis oriented perpendicularly to the substrate, said in-plane magnetic film underlayer disposed at the substrate side of said in-plane magnetic film, said in-plane magnetic film being disposed closer to the substrate than said vertical magnetic film, a separation film being disposed between said in-plane magnetic film and said vertical magnetic film, said separation film containing one or more of Ta, Re, CuTi, SiC, W, NiP, Zr, Ti and C as a main component, and said vertical magnetic film containing a Co alloy consisting of from 16 to 30 at % of Cr, from 0 to 15 at % of Pt, from 2 to 10 at % of Ta, from 0 to 5 at % of Zr and the balance of Co, as a main component.

11. The magnetic recording medium as claimed in claim 10, wherein said separation film has a thickness of from 5 to 200 Å.

12. The magnetic recording medium as claimed in claim 10, further comprising a nonmagnetic intermediate layer having an hcp structure disposed between said separation film and said vertical magnetic film.

13. The magnetic recording medium as claimed in claim 11, further comprising a nonmagnetic intermediate layer having an hcp structure disposed between said separation film and said vertical magnetic film.

14. The magnetic recording medium as claimed in claim 10, wherein the clearance between said in-plane magnetic film and said vertical magnetic film is from 10 to 500 Å.

15. The magnetic recording medium as claimed in claim 10, further comprising an in-plane magnetic film underlayer disposed at the substrate side of said in-plane magnetic film, and said in-plane magnetic film underlayer contains Cr or an alloy consisting of Cr and one or more of Ti, Mo, W and V, as a main component.

16. The magnetic recording medium as claimed in claim 15, wherein said in-plane magnetic film contains a Co alloy consisting of from 12 to 25 at % of Cr, from 0 to 15 at % of Pt, from 1 to at % of Ta, from 0 to 10 at % of one or more of Zr, Re, Cu and V, and the balance of Co, as a main component.

17. A magnetic recording medium comprising a substrate having thereon an in-plane magnetic film underlayer, an in-plane magnetic film having a magnetic easy axis oriented in the in-plane direction with respect to the substrate, a separation film comprising a material capable of growing non-epitaxially to the in-plane magnetic film, a nonmagnetic intermediate layer having an hcp structure and a vertical magnetic film having a magnetic easy axis oriented perpendicularly to the substrate, said in-plane magnetic film underlayer disposed at the substrate side of said in-plane magnetic film, said separation film being disposed between said in-plane magnetic film and said vertical magnetic film, said nonmagnetic intermediate layer containing a Co alloy consisting of from 25 to 50 at % of Cr, from 0 to 15 at % of Pt, from 0 to 10 at % of Ta, Zr, Cu and Re, and the balance of Co, as a main component, and said vertical magnetic film containing a Co alloy consisting of from 16 to 30 at % of Cr, from 0 to 15 at % of Pt, from 2 to 10 at % of Ta, from 0 to 5 at % of Zr and the balance of Co, as a main component.

18. The magnetic recording medium as claimed in claim 17, wherein said nonmagnetic intermediate layer has a thickness of from 20 to 400 Å.

19. The magnetic recording medium as claimed in claim 17, wherein the clearance between said in-plane magnetic film and said vertical magnetic film is from 10 to 500 Å.

20. The magnetic recording medium as claimed in claim 18, wherein the clearance between said in-plane magnetic film and said vertical magnetic film is from 10 to 500 Å.

* * * * *